US005924735A

United States Patent [19]
Meyer, Jr.

[11] Patent Number: 5,924,735
[45] Date of Patent: Jul. 20, 1999

[54] HIGH STRENGTH MUD FLAP AND METHOD OF PRODUCING SAME

[76] Inventor: Carroll O. Meyer, Jr., 3317 Oak Hill St., Sierra Vista, Ariz. 85635

[21] Appl. No.: 08/777,033

[22] Filed: Dec. 30, 1996

[51] Int. Cl.$^6$ ................................................... B62D 25/18
[52] U.S. Cl. ............................................. 280/851; 280/154
[58] Field of Search ..................................... 280/847, 848, 280/154, 851

[56] References Cited

U.S. PATENT DOCUMENTS

| | | | |
|---|---|---|---|
| 333,408 | 12/1885 | Hale | 280/851 |
| 900,163 | 10/1908 | Groehn | 280/154 |
| 2,782,053 | 2/1957 | Long | 280/851 |
| 2,809,848 | 10/1957 | Carswell | 280/851 |
| 3,027,178 | 3/1962 | Eaves | 280/851 |
| 3,091,478 | 5/1963 | Ambli | 280/851 |
| 3,724,871 | 4/1973 | Evans | 280/851 |
| 3,869,617 | 3/1975 | Gaussoin et al. | 280/851 |
| 3,877,722 | 4/1975 | Conner | 280/154 |
| 3,953,053 | 4/1976 | Arenhold | 280/851 |
| 4,349,972 | 9/1982 | Bruce, Jr. et al. | 37/55 |
| 4,591,178 | 5/1986 | Mortvedt et al. | 280/154 |
| 4,735,428 | 4/1988 | Antekeier | 280/454 |
| 4,832,356 | 5/1989 | Liberto et al. | 280/851 |
| 4,928,994 | 5/1990 | Buchner | 280/851 |
| 4,964,655 | 10/1990 | Tucker | 280/851 |
| 4,966,378 | 10/1990 | Cook | 280/154 |
| 5,050,908 | 9/1991 | Betts | 280/851 |
| 5,086,552 | 2/1992 | Moore | 29/403.1 |
| 5,121,944 | 6/1992 | Haddox | 280/848 |
| 5,199,742 | 4/1993 | Gotz et al. | 280/851 |
| 5,340,630 | 8/1994 | Tripp | 428/54 |
| 5,407,229 | 4/1995 | Garrett | 280/851 |
| 5,421,668 | 6/1995 | Cowen et al. | 404/6 |
| 5,509,690 | 4/1996 | Whittington | 280/851 |
| 5,645,494 | 7/1997 | Dionne et al. | 473/278 |
| 5,675,954 | 10/1997 | Garcia | 52/518 |
| 5,697,645 | 12/1997 | Nagler | 280/851 |
| 5,709,049 | 1/1998 | Baird | 47/27 |

FOREIGN PATENT DOCUMENTS

| | | | |
|---|---|---|---|
| 1480377 | 10/1969 | Germany | 280/851 |
| 4035107 | 11/1991 | Germany | 280/851 |
| 2208160 | 3/1989 | United Kingdom | 280/851 |

*Primary Examiner*—Robert J. Oberleitner
*Assistant Examiner*—Bridget Avery

[57] ABSTRACT

A high strength mud flap (16) for deflecting debris (18) from a rear wheel (20) of a truck (22) comprising a plurality of curved flexible strong strips (24) of equal lengths. A facility (26) is for attaching abutting side edges of the curved flexible strong strips (24) together to produce a desired width thereof. A flexible strong band (28) is of a length equal to the width of the abutting curved flexible strong strips (24). A facility (30) is for affixing the flexible strong band (28) across the entire bottom edges (32) of the abutting curved flexible strong strips (24). A device (34) is for drilling a plurality of spaced apart anchor holes (36) adjacent the entire top edges (38) of the abutting curved flexible strong strips (24), so as to be mounted to a mud flap bracket (40) behind the rear wheel (20) of the truck (22). A plurality of flexible strong narrow straps (42) are provided. Each narrow strap (42) is of a length equal to the lengths of the curved flexible strong strips (24). A facility (44) is for securing each flexible strong narrow strap (42) onto two abutting side edges of two curved flexible strong strips (24), so that when mounted to the mud flap bracket (40), the debris (18) coming from the rear wheel (20) of the truck (22) will be deflected downwardly.

3 Claims, 7 Drawing Sheets

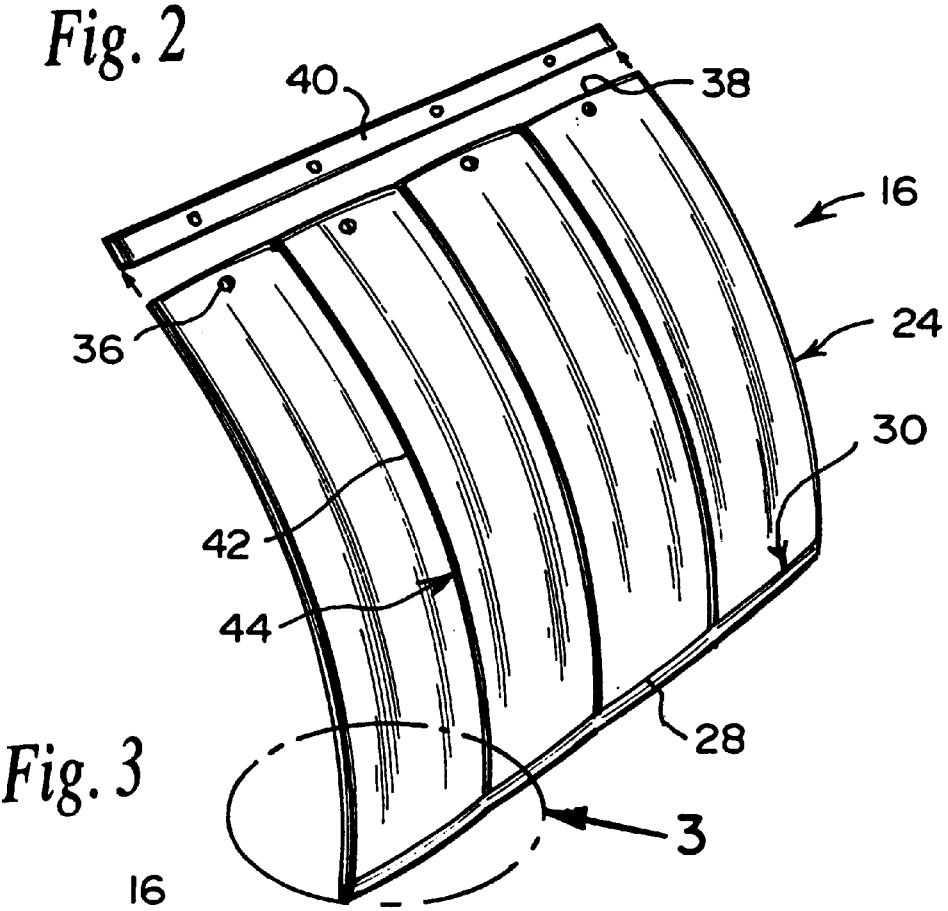
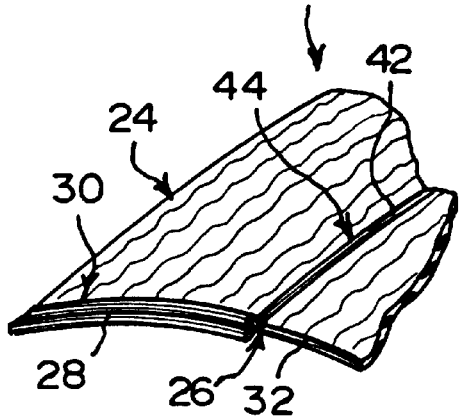

HIGH STRENGTH MUD FLAP AND METHOD OF PRODUCING SAME

BACKGROUND OF THE INVENTION

1. Field of the Invention

The instant invention relates generally to splash guards and more specifically it relates to a high strength mud flap. The high strength mud flap is manufactured entirely of a recycled steel belted used tire that is esthetically pleasing to the eye.

2. Description of the Prior Art

Numerous splash guards have been provided in prior art. For example, U.S. Pat. Nos. 4,964,655 to Tucker; 5,050,908 to Betts; 5,407,299 to Garrett and 5,509,690 to Whittington all are illustrative of such prior art. While these units may be suitable for the particular purpose to which they address, they would not be as suitable for the purposes of the present invention as heretofore described.

TUCKER, LARRY C.

Heavy Duty Mud Flap

U.S. Pat. No. 4,964,655

This invention is related to a safety apparatus for reducing side spray for trucks and other vehicles. The apparatus includes a flexible flap suspended behind the tires of the vehicle with a stiffening device of relatively elongate construction arranged at the outer edge thereof and extending forwardly therefrom. The flap further lacks any substantial stiffening element at the inner edge thereby effecting the flap so that the flap deflects inwardly along the inner edge of the flap and thereby directs air currents and roadway fluids to the inside of the truck. The stiffening device also obstructs fluids from passing around the outer edge of the flap with a forwardly extending main wall portion and an inwardly directed leading wall portion.

BETTS, WILLIAM M.

Mud Flap Anti-Sail Bracket

U.S. Pat. No. 5,050,908

A mud flap anti-sail bracket having depending support rods secured to the upper corners of the mud flap and carrying a cross-member at variable vertical locations therealong.

GARRETT, MILTON

Universal Application Contoured Splash Guard

U.S. Pat. No. 5,407,229

A splash guard capable of being applied to a wide variety of motor vehicles comprises a primary panel, a secondary panel having an area substantially less than the primary panel, and a tertiary panel. The primary panel has an outer edge, an inner edge, a bottom edge, and a top edge. The primary panel also has a forward splash-deflecting surface and an opposite rearward surface, the rearward surface being attachable directly to the wheel arch of a motor vehicle. The primary panel is elastically deformable to conform with the curvature of the wheel arch for a wide variety of motor vehicles. The secondary panel depends from the outer edge and the bottom edge of the primary panel and forms an angle of less than 180 degrees with the forward surface of the primary panel. The second panel has a proximal edge connected to the primary panel and a distal edge, the distal edge of the secondary panel lying substantially in a single plane. The tertiary panel depends from the distal edge of the secondary panel. In a second embodiment of the invention, the splash guard lacks a tertiary panel. In a third embodiment, the primary, secondary and tertiary panels are substantially laterally symmetric.

WHITTINGTON, FLAVIOUS L.

Side Spray Safety Apparatus

U.S. Pat. No. 5,509,690

The present invention relates to an improved heavy duty mud flap. The improved mud flap includes metal segments on the outer edges of the mud flap that allow movement of the mud flap in one direction only. The segments are connected by rods which contain a plurality of alternating rubber discs and spacers between the outer metal segments. The rubber discs and spacers freely rotate about the rods, such rotation helping reduce snagging of the mud flap on objects or tires. The series of rubber discs and spacers also act to break up spray generated by vehicle tires coming in contact with wet conditions. Finally, a mounting device is included to attach the mud flap to a vehicle frame.

SUMMARY OF THE INVENTION

A primary object of the present invention is to provide a high strength mud flap and method of producing same that will overcome the shortcomings of the prior art devices.

Another object is to provide a high strength mud flap and method of producing same that is manufactured entirely out of a recycled steel belted used tire, wherein the used tire is an unlimited source of raw material for construction of the mud flap.

An additional object is to provide a high strength mud flap and method of producing same, in which the manufactured end product is esthetically pleasing to the eye and will minimize the amount of debris that would hit vehicles traveling behind a truck installed with two of these mud flaps at the rear thereof.

A further object is to provide a high strength mud flap and method of producing same that is simple and easy to use.

A still further object is to provide a high strength mud flap and method of producing same that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view of the instant invention per se, ready to be installed on a mud flap bracket.

FIG. 3 is a further enlarged perspective view of a segment thereof as indicated by arrow 3 in FIG. 2.

Similar reference characters denote corresponding features consistently throughout the attached drawings.

DETAILED DESCRIPTION OF THE PREFERRED EMBODIMENTS

Figure 1:
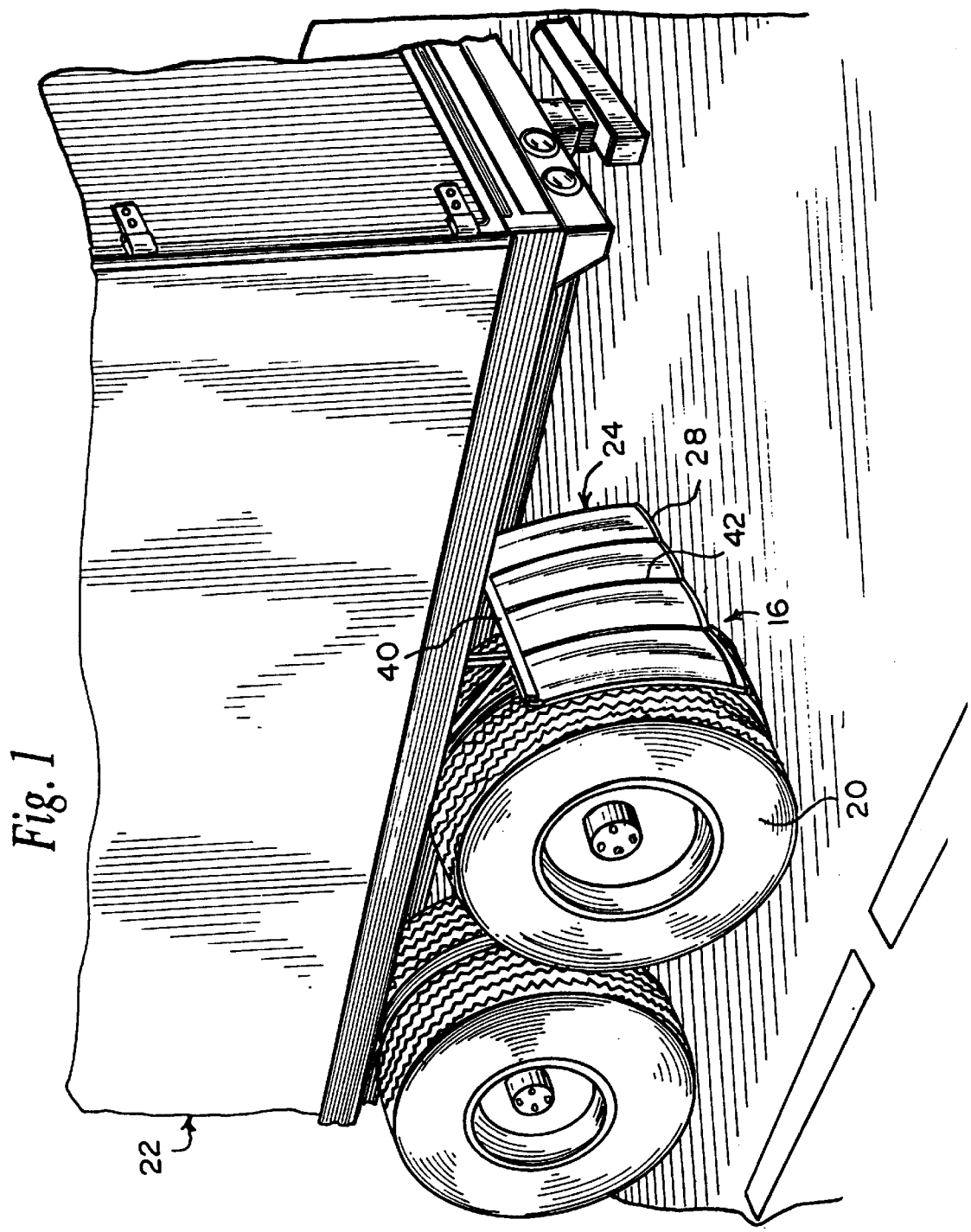
FIG. 1 is a rear perspective view of a portion of a truck with the instant invention installed thereon.
Figure 4:
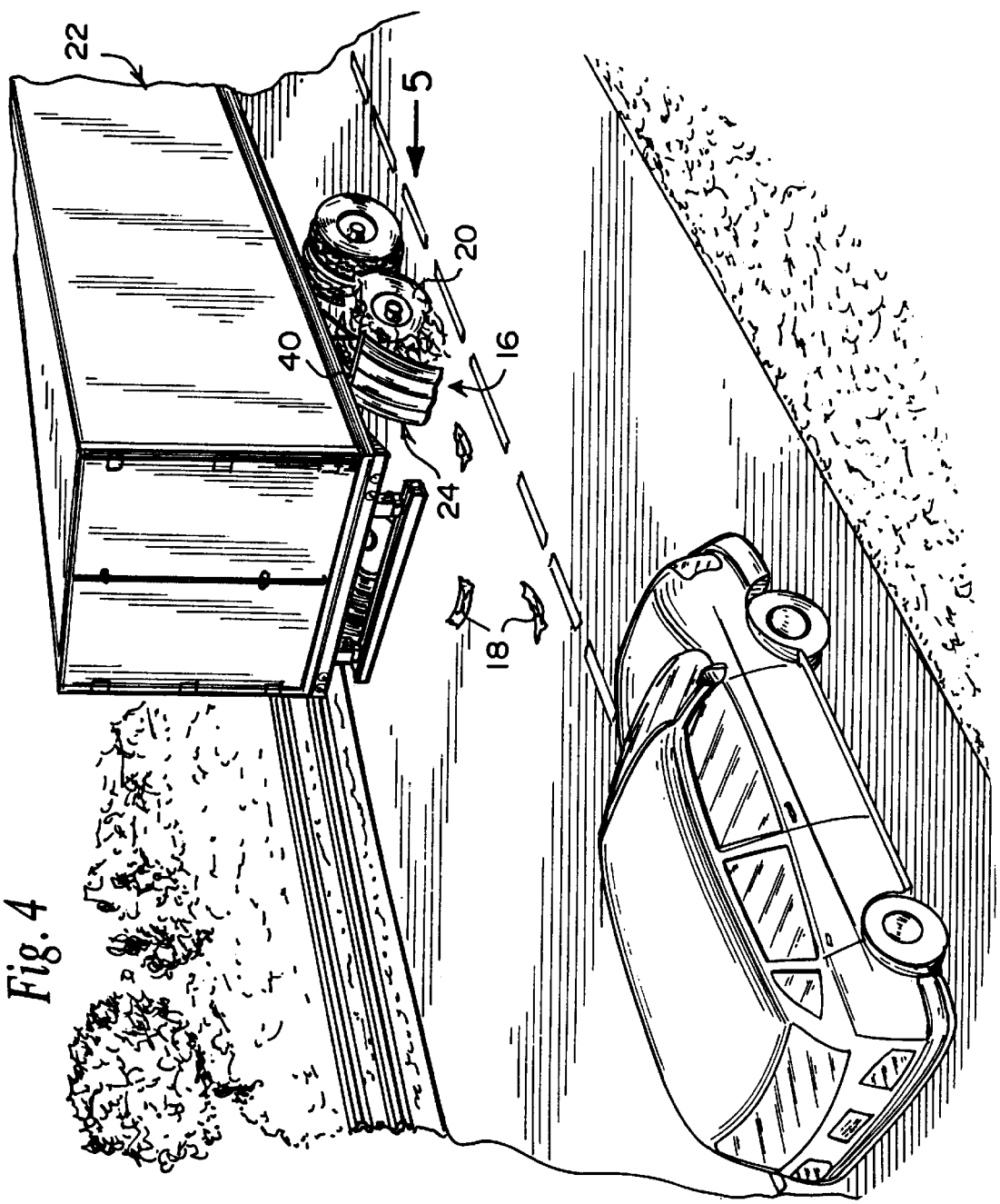
FIG. 4 is a rear perspective view of a portion of a truck with a rear blowout tire, showing the instant invention installed in place with pieces of the blowout tires deflected downwardly onto the roadway instead of going onto a motor vehicle behind.
Figure 5:
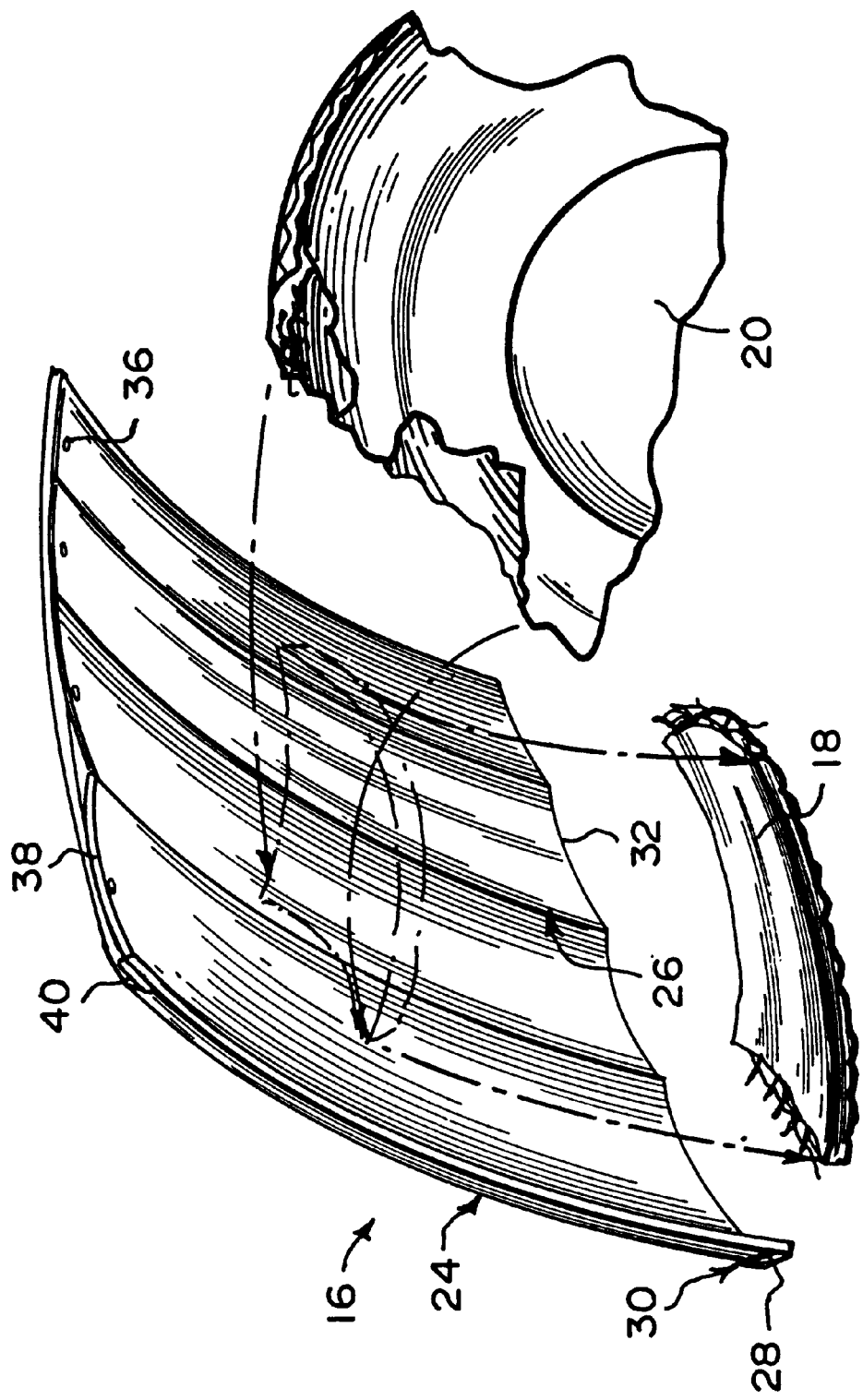
FIG. 5 is an enlarged perspective view taken in the direction of arrow 5 in FIG. 4, with parts removed, showing the instant invention deflecting a piece of the blowout tire downwardly.
Figure 6:
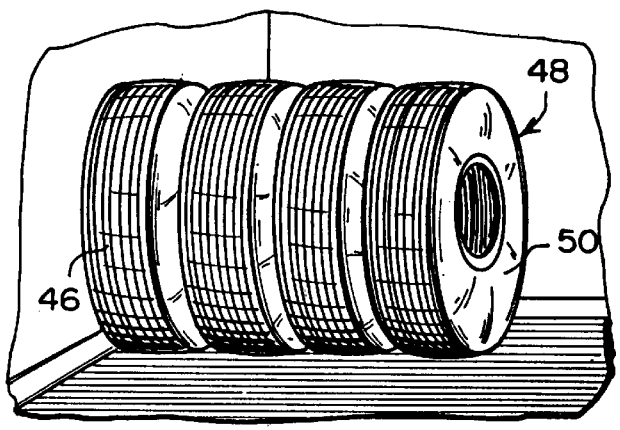
FIGS. 6 through 13 are perspective view showing various steps taken in producing the instant invention.
Figure 7:
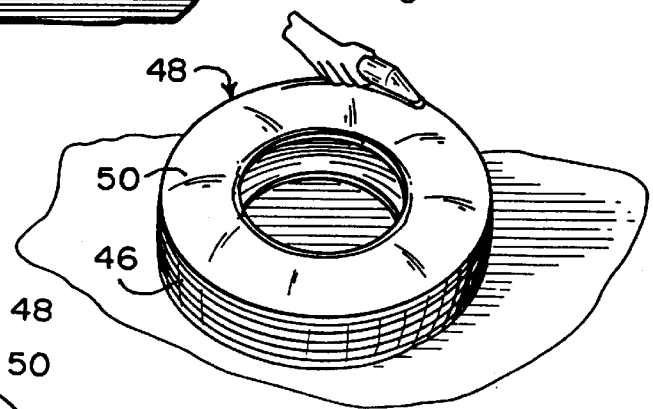
Figure 8:
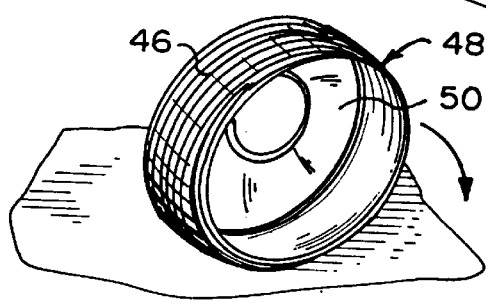
Figure 9:
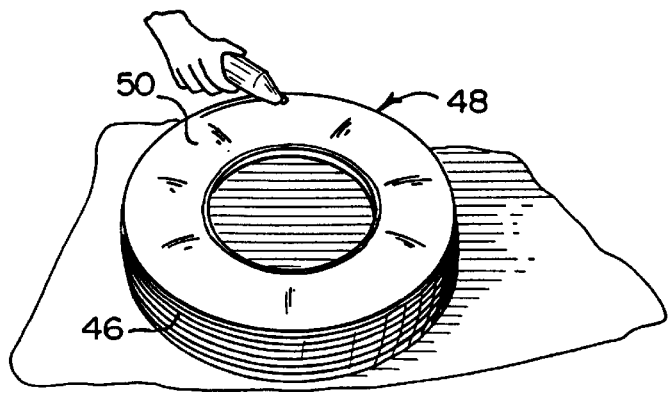
Figure 10:
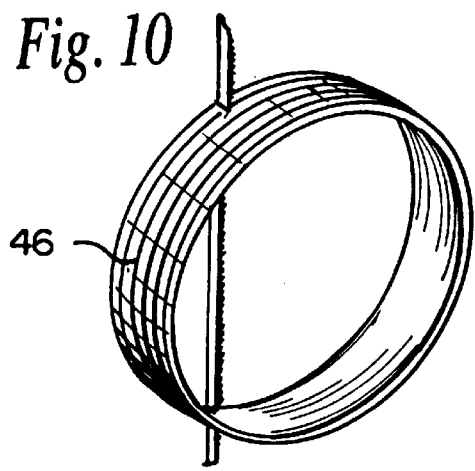
Figure 11:
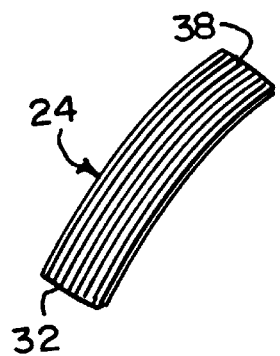
Figure 12:
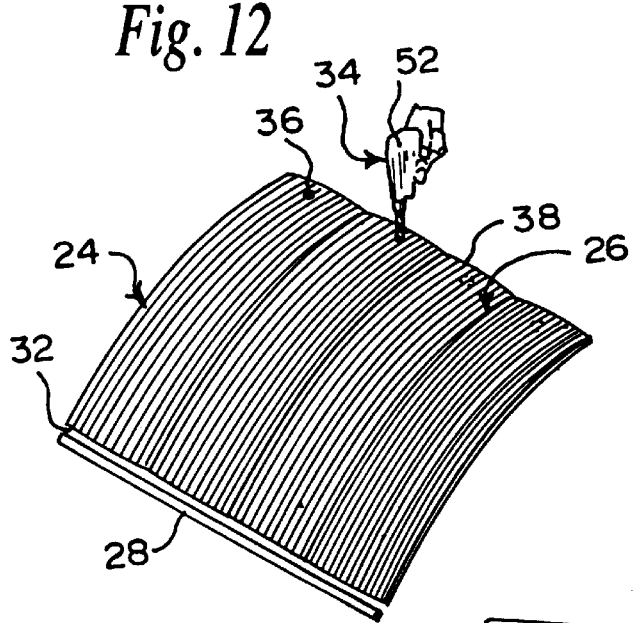
Figure 13:
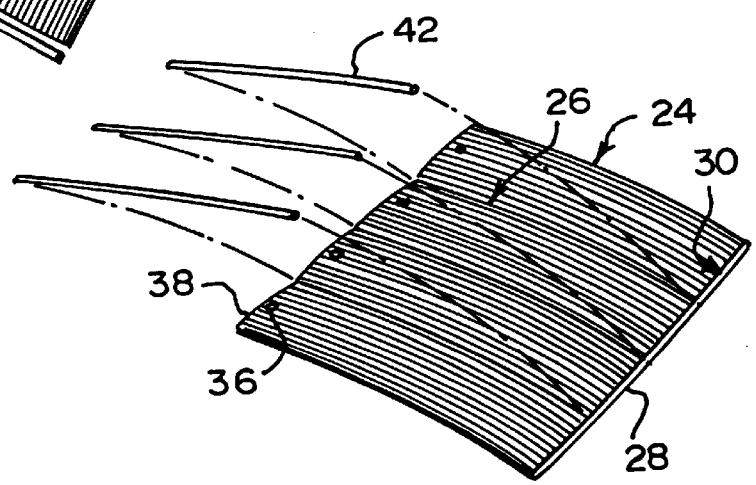

Turning now descriptively to the drawings, in which similar reference characters denote similar elements throughout the several views, FIGS. 1 to 13 illustrate a high strength mud flap 16 for deflecting debris 18 from a rear wheel 20 of a truck 22, comprising a plurality of curved flexible strong strips 24 of equal lengths. A facility 26 is for attaching abutting side edges of the curved flexible strong strips 24 together, to produce a desired width thereof. A flexible strong band 28, is a length equal to the width of the abutting curved flexible strong strips 24. A facility 30 is for affixing the flexible strong band 28 across the entire bottom edges 32 of the abutting curved flexible strong strips 24. A device 34 is for drilling a plurality of spaced apart anchor holes 36 adjacent the entire top edges 38 of the abutting curved flexible strong strips 24, so as to be mounted to a mud flap bracket 40 behind the rear wheel 20 of the truck 22. A plurality of flexible strong narrow straps 42 are provided. Each narrow strap 42 is of a length equal to the lengths of the curved flexible strong strips 24. A facility 44 is for securing each flexible strong narrow strap 42 onto two abutting side edges of two curved flexible strong strips 24, so that when mounted to the mud flap bracket 40, the debris 18 coming from the rear wheel 20 of the truck 22 will be deflected downwardly.

Each curved flexible strong strip 24 is fabricated out of a tread portion 46 of a used steel belted rubber tire 48. The attaching facility 30 is accomplished by using vulcanization.

The flexible strong band 28 is fabricated out of a side wall portion 50 of the used steel belted rubber tire 48. The affixing facility 30 is accomplished by using vulcanization.

The drilling of the anchor holes 36 is accomplished by using a hand drill 52. Each flexible strong narrow strap 42 is fabricated out of the side wall portion 50 of the used steel belted rubber tire 48. The securing facility 44 is accomplished by using vulcanization.

Figure 14:
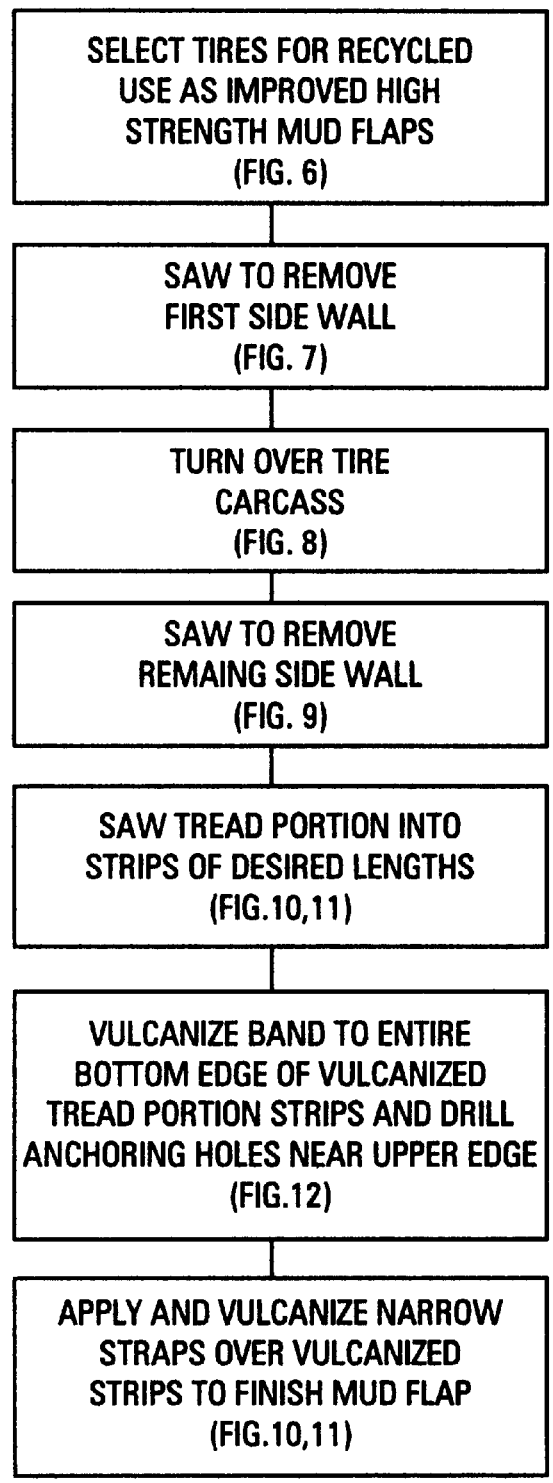
FIG. 14 is a block flow diagram indicating the various steps taken in FIGS. 6 through 13.

A method of producing the high strength mud flap 16 for deflecting debris 18 from the rear wheel 20 of the truck 22, is indicated in FIG. 14 and comprises the steps of:

1. Selecting a used steel belted rubber tire 48 (see FIG. 6).
2. Sawing a first side wall portion 50 of the used steel belted rubber tire 48 (see FIG. 7).
3. Removing the first side wall portion 50 away from the used steel belted rubber tire 48 (see FIG. 8).
4. Turning over the carcass of the used steel belted rubber tire 48 (see FIG. 8).
5. Sawing a second side wall portion 50 of the used steel belted rubber tire 48 (see FIG. 9).
6. Removing the second side wall portion 50 away from the used steel belted rubber tire 48 (see FIG. 6).
7. Sawing the tread portion 46 of the used steel belted rubber tire 48 into curved strips 24 of equal lengths (see FIGS. 10 and 11).
8. Placing the curved strips 24 made from the tread portion 46 of the used steel belted rubber tire 48 in side by side relationships, to provide a desired width of the mud flap 16 (see FIG. 12).
9. Attaching by vulcanization abutting side edges of the curved strips 24 made from the tread portion 46 of the used steel belted rubber tire 48 together (see FIG. 12).
10. Putting a band 28 made from one of the side wall portions 50 of the used steel belted rubber tire 48 across the entire bottom edges 32 of the abutting curved strips 24 made from the tread portion 46 of the used steel belted rubber tire 48 (see FIG. 12).
11. Affixing by vulcanization the band 28 onto the bottom edges 32 of the abutting curved strips 24 made from the tread portion 46 of the used steel belted rubber tire 48 (see FIG. 13).
12. Drilling with a hand drill 52 a plurality of spaced apart anchor holes 36 adjacent the entire top edges 38 of the abutting curved strips 24 made from the tread portion 46 of the used steel belted rubber tire 48, so as to be mounted to the mud flap bracket 40 behind the rear wheel 20 of the truck 22 (see FIG. 12).
13. Applying each of the plurality of narrow straps 42 made from one of the side wall portions 50 of the used steel belted rubber tire 48 onto two abutting side edges of two curved strips 24 made from the tread portion 46 of the used steel belted rubber tire 48 (see FIG. 13).
14. Securing by vulcanization each narrow strap 42 onto two abutting side edges of two curved strips 24 made from the tread portion 46 of the used steel belted rubber tire 48, 60 that when mounted to the mud flap bracket 40, the debris 18 coming from the rear wheel 20 of the truck will be deflected downwardly (see FIG. 5).

LIST OF REFERENCE NUMBERS

| | |
|---|---|
| 16 | high strength mud flap |
| 18 | debris |
| 20 | rear wheel of 22 |
| 22 | truck |
| 24 | curved flexible strong strips of 16 |
| 26 | attaching facility for 24 |
| 28 | flexible strong band of 16 |
| 30 | affixing facility for 28 |
| 32 | bottom edge of 24 |
| 34 | drilling device for 36 |
| 36 | anchor hole in 24 |
| 38 | top edge of 24 |
| 40 | mud flap bracket on 22 |
| 42 | flexible strong narrow strap of 16 |
| 44 | securing facility for 42 |
| 46 | tread portion of 48 |
| 48 | used steel belted rubber tire |
| 50 | side wall portion of 48 |
| 52 | hand drill for 34 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of producing a high strength mud flap for deflecting debris from a rear wheel of a truck comprising the steps of:

a) selecting a used steel belted rubber tire;

b) sawing a first side wall portion of said used steel belted rubber tire;

c) removing said first side wall portion away from said used steel belted rubber tire;

d) turning over the carcass of said used steel belted rubber tire;

e) sawing a second side wall portion of said used steel belted rubber tire;

f) removing said second side wall portion away from said used steel belted rubber tire;

g) sawing a tread portion of said used steel belted rubber tire into curved strips of equal lengths;

h) placing said curved strips made from said tread portion of said used steel belted rubber tire in side by side relationships to provide a desired width of said mud flap; and i) attaching by vulcanization abutting side edges of said curved strips made from said tread portion of said used steel belted rubber tire together.

2. A method of producing a high strength mud flap as recited in claim 1, comprising the additional steps of:

a) putting a band made from one of said side wall portions of said used steel belted rubber tire across entire bottom edges of said abutting curved strips made from said tread portion of said used steel belted rubber tire;

b) affixing by vulcanization said band onto said bottom edges of said abutting curved strips made from said tread portion of said used steel belted rubber tire;

c) drilling with a hand drill a plurality of spaced apart anchor holes adjacent entire top edges of said abutting curved strips made from said tread portion of said used steel belted rubber tire, so as to be mounted to a mud flap bracket behind the rear wheel of the truck;

d) applying each of a plurality of narrow straps made from one of said side wall portions of said used steel belted rubber tire onto two abutting side edges of two said curved strips made from said tread portion of said used steel belted rubber tire; and e) securing by vulcanization each said narrow strap onto two abutting side edges of two said curved strips made from said tread portion of said used steel belted rubber tire, so that when mounted to the mud flap bracket, the debris coming from the rear wheel of the truck will be deflected downwardly.

3. A method of producing a high strength mud flap for deflecting debris from a rear wheel of a truck comprising the steps of:

a) selecting a used steel belted rubber tire;

b) sawing a first side wall portion of said used steel belted rubber tire;

c) removing said first side wall portion away from said used steel belted rubber tire;

d) turning over the carcass of said used steel belted rubber tire;

e) sawing a second side wall portion of said used steel belted rubber tire;

f) removing said second side wall portion away from said used steel belted rubber tire;

g) sawing a tread portion of said used steel belted rubber tire into curved strips of equal lengths;

h) placing said curved strips made from said tread portion of said used steel belted rubber tire in side by side relationships to provide a desired width of said mud flap;

i) attaching by vulcanization abutting side edges of said curved strips made from said tread portion of said used steel belted rubber tire together;

j) putting a band made from one of said side wall portions of said used steel belted rubber tire across entire bottom edges of said abutting curved strips made from said tread portion of said used steel belted rubber tire;

k) affixing by vulcanization said band onto said bottom edges of said abutting curved strips made from said tread portion of said used steel belted rubber tire;

l) drilling with a hand drill a plurality of spaced apart anchor holes adjacent entire top edges of said abutting curved strips made from said tread portion of said used steel belted rubber tire, so as to be mounted to a mud flap bracket behind the rear wheel of the truck;

m) applying each of a plurality of narrow straps made from one of said side wall portions of said used steel belted rubber tire onto two abutting side edges of two said curved strips made from said tread portion of said used steel belted rubber tire; and n) securing by vulcanization each said narrow strap onto two abutting side edges of two said curved strips made from said tread portion of said used steel belted rubber tire, so that when mounted to the mud flap bracket, the debris coming from the rear wheel of the truck will be deflected downwardly.

* * * * *